United States Patent
Burtch

(10) Patent No.: US 11,180,080 B2
(45) Date of Patent: Nov. 23, 2021

(54) DOOR OPENING AID SYSTEMS AND METHODS

(71) Applicant: Continental Automotive Systems Inc., Auburn Hills, MI (US)

(72) Inventor: Joseph Brian Burtch, Lake Orion, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/713,832

(22) Filed: Dec. 13, 2019

(65) Prior Publication Data
US 2021/0178966 A1    Jun. 17, 2021

(51) Int. Cl.
*B60Q 1/00* (2006.01)
*B60Q 9/00* (2006.01)
*B60J 5/04* (2006.01)

(52) U.S. Cl.
CPC ............ *B60Q 9/005* (2013.01); *B60J 5/0493* (2013.01); *B60Q 9/007* (2013.01)

(58) Field of Classification Search
CPC ......... B60Q 9/005; B60Q 9/007; B60J 5/0493
USPC ........................................................ 340/435
See application file for complete search history.

(56) References Cited

U.S. PATENT DOCUMENTS

| | | | | |
|---|---|---|---|---|
| 2004/0200149 | A1* | 10/2004 | Dickmann | G01S 17/04 49/26 |
| 2005/0280284 | A1* | 12/2005 | McLain | B60R 13/043 296/146.1 |
| 2010/0145617 | A1* | 6/2010 | Okada | B60R 1/12 701/300 |
| 2013/0113614 | A1* | 5/2013 | Yopp | B60Q 9/00 340/438 |
| 2013/0234844 | A1 | 9/2013 | Yopp | |
| 2015/0084779 | A1* | 3/2015 | Saladin | H04W 4/029 340/686.6 |
| 2015/0227775 | A1* | 8/2015 | Lewis | G06K 9/0063 345/419 |
| 2016/0055384 | A1* | 2/2016 | Yoo | G06K 9/6201 701/41 |
| 2016/0208537 | A1* | 7/2016 | Senguttuvan | E05F 15/73 |
| 2016/0312517 | A1* | 10/2016 | Elie | G05B 9/02 |
| 2016/0355127 | A1* | 12/2016 | Compton | E05F 15/43 |
| 2017/0152698 | A1* | 6/2017 | Bae | E05F 15/73 |
| 2017/0241182 | A1* | 8/2017 | Hung | E05F 15/46 |
| 2017/0313247 | A1 | 11/2017 | Hsu et al. | |
| 2017/0371343 | A1 | 12/2017 | Cohen et al. | |
| 2018/0012085 | A1* | 1/2018 | Blayvas | H04N 13/20 |
| 2018/0336786 | A1* | 11/2018 | Salter | B60Q 1/323 |
| 2019/0100950 | A1* | 4/2019 | Aravkin | G08G 1/168 |
| 2019/0202373 | A1* | 7/2019 | Kubota | G06K 9/00791 |
| 2019/0205662 | A1* | 7/2019 | Samal | H04N 5/225 |
| 2019/0211587 | A1* | 7/2019 | Ganeshan | B60R 21/0153 |
| 2019/0235520 | A1* | 8/2019 | Parchami | G05D 1/0251 |

(Continued)

FOREIGN PATENT DOCUMENTS

EP    2579231 A1    4/2013

*Primary Examiner* — Zhen Y Wu

(57) ABSTRACT

A system for assisting in the opening of a vehicle door includes a camera disposed on the vehicle for obtaining a plurality of images of an object at the periphery of the vehicle. The example system includes a controller which is configured to determine a distance between the object and a door of the vehicle based on the plurality of images and to initiate a vehicle response based on the distance.

18 Claims, 7 Drawing Sheets

(56) References Cited

U.S. PATENT DOCUMENTS

| | | | |
|---|---|---|---|
| 2020/0086852 A1* | 3/2020 | Krekel | B60W 50/14 |
| 2020/0149329 A1* | 5/2020 | Miyashiro | E05B 81/64 |
| 2020/0209401 A1* | 7/2020 | Motoyama | G01S 17/931 |
| 2020/0284876 A1* | 9/2020 | Hurd | G01S 7/414 |
| 2020/0329215 A1* | 10/2020 | Tsunashima | G01C 3/14 |
| 2021/0061262 A1* | 3/2021 | Kniep | B62D 15/0285 |

\* cited by examiner

DOOR OPENING AID SYSTEMS AND METHODS

BACKGROUND

The present disclosure provides systems and methods for providing assistance to users entering or exiting a vehicle using one or more of the vehicle's doors.

Vehicles may include one or more doors through which a user may enter or exit.

SUMMARY

A method for assisting in the opening of a vehicle door, according to an example of this disclosure, includes obtaining a plurality of images of an object at the periphery of the vehicle using a camera on the vehicle, determining a distance between the object and a door of the vehicle based on the plurality of images, and initiating a vehicle response based on the distance.

In a further example of the foregoing, the distance is a distance between the object and an edge of the door farthest from a hinge of the door.

In a further example of any of the foregoing, the camera is disposed on or adjacent a side view mirror of the vehicle.

In a further example of any of the foregoing, the camera includes a fish eye lens.

In a further example of any of the foregoing, the determining step includes utilizing structure from motion to estimate the three-dimensional structure of the object based on the plurality of images.

In a further example of any of the foregoing, the plurality of images are obtained as the vehicle pulls into a parking spot.

In a further example of any of the foregoing, the determining step is performed at a controller on the vehicle.

In a further example of any of the foregoing, the vehicle response is an audiovisual response that indicates whether a collision between the door and the object is imminent.

In a further example of any of the foregoing, the vehicle response is an audible indication of the distance.

In a further example of any of the foregoing, the camera is located on one of the driver's side and passenger's side of the vehicle. The door is located on the one of the driver's side and passenger's side of the vehicle.

In a further example of any of the foregoing, the door is a front door.

In a further example of any of the foregoing, the door is a rear door.

In a further example of any of the foregoing, the determining step includes utilizing semantic segmentation based on the plurality of images, and the plurality of images are obtained as the vehicle pulls into a parking spot.

A system for assisting in the opening of a vehicle door according to an example of this disclosure includes a camera disposed on the vehicle for obtaining a plurality of images of an object at the periphery of the vehicle. The example system includes a controller which is configured to determine a distance between the object and a door of the vehicle based on the plurality of images and to initiate a vehicle response based on the distance.

In a further example of the foregoing, the vehicle response is an audiovisual response that indicates whether a collision between the door and the object is imminent.

In a further example of any of the foregoing, the vehicle response is an audible indication of the distance.

In a further example of any of the foregoing, the camera is disposed on or adjacent a side view mirror of the vehicle.

In a further example of any of the foregoing, the camera includes a fish eye lens.

In a further example of any of the foregoing, the controller is configured to utilize a structure from motion algorithm to estimate the three-dimensional structure of the object based on the plurality of images.

In a further example of any of the foregoing, the controller is configured to utilize a semantic segmentation algorithm to determine the distance.

These and other features may be best understood from the following specification and drawings, the following of which is a brief description.

BRIEF DESCRIPTION OF THE DRAWINGS

FIG. 1 schematically illustrates a system for assisting in the opening of a door of a vehicle.

FIG. 2 schematically illustrates another system for assisting in the opening of a door of a vehicle.

FIG. 3A schematically illustrates the vehicle of FIG. 2 at a first door position.

FIG. 3B schematically illustrates the vehicle of FIGS. 2-3A at a second door position.

FIG. 3C schematically illustrates the vehicle of FIGS. 2-3B at a third door position.

FIG. 4A schematically illustrates the vehicle of FIG. 2 at a first position when parking.

FIG. 4B schematically illustrates the vehicle of FIG. 2 at a second position when parking.

FIG. 4C schematically illustrates the vehicle of FIG. 2 at a third position when parking.

FIG. 5 illustrates an example hinge.

FIG. 6 illustrates a flowchart of an example method for assisting in the opening of a door of a vehicle.

DETAILED DESCRIPTION

This disclosure pertains to systems and methods for assisting the operation of one or more doors in a vehicle.

FIG. 1 schematically illustrates an example system 10 for assisting in the opening of one or more doors 12 of a vehicle 14. The vehicle 14 may be any type of vehicle, some examples including cars, trucks, motorcycles, buses, recreational vehicles, etc. The system 10 includes a sensor 16 for sensing an object 18 at a periphery of the vehicle 14. A controller 20 in communication with the sensor 16 may determine a distance D between the object 18 and the door 12 based on the information from the sensor 16 and initiate a vehicle response based on the distance.

In some examples, the sensor 16 may include one or more of a camera, radar sensor, laser, LIDAR sensor and ultrasonic sensor. In some examples, the camera is a surround-view camera on the vehicle 14. Although one sensor 16 is shown in the schematic example of FIG. 1, more sensors may be utilized in some examples. In some examples, the sensor 16 may be located adjacent one or more of a front grill, a side mirror, and a trunk area.

In some examples, the controller 20 may be an electronic control unit (ECU) that may include one or more individual electronic control units that control one or more electronic systems or subsystems within the vehicle 14. The controller 20, in some examples, may include one or more computing devices, each having one or more of a computer processor, memory, storage means, network device and input and/or output devices and/or interfaces. The controller 20 may be programmed to implement one or more of the methods or processes described herein.

In some examples, the object 18 may include one or more of a vehicle, a wall, a barrier, a pillar, a construction object, and a garage object, such as a shelving unit or snowblower. In some examples, the object 18 is stationary.

Figure 1:
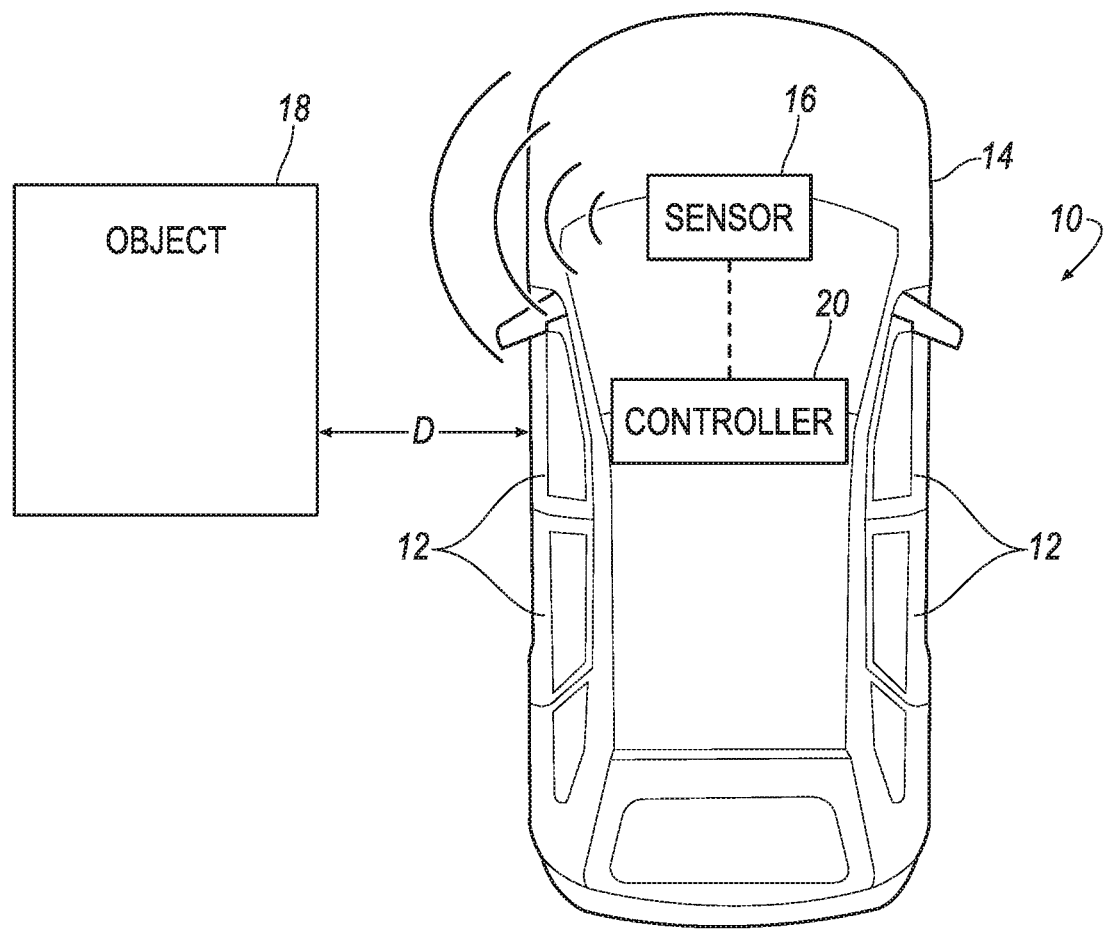
Figure 2:
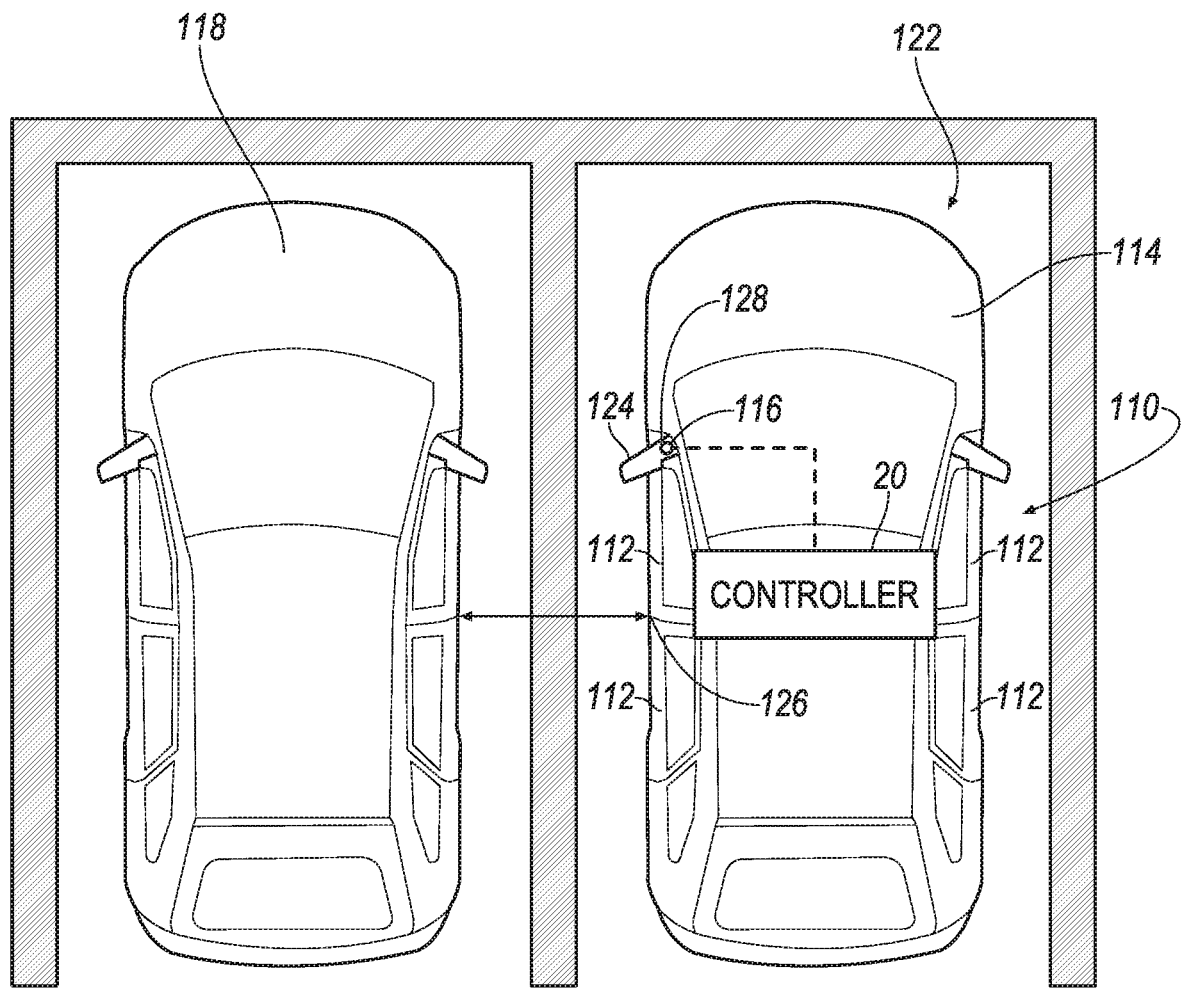

FIG. 2 schematically illustrates an example system 110 for assisting in the opening of one or more doors 112 of a vehicle 114. It should be understood that like reference numerals identify corresponding or similar elements throughout the several drawings. The system 110 includes a camera 116 on the vehicle 114 for obtaining one or more images of an object 118 at the periphery of the vehicle 114. A controller 120 may determine a distance D between the object 118 and the door 112 based on the one or more images and initiate a vehicle response based on the distance.

In some examples, as shown, the object 118 is a parked vehicle or other object next to a vehicle parking spot 122. In some examples, as shown, the camera 116 is disposed on or adjacent a side view mirror 124 of the vehicle. Although the illustrative example shows one camera 116 at the driver side view mirror, a second similar camera may be disposed on or adjacent a passenger side view mirror in some examples. In some examples, a driver side camera 116 provides information related to the driver side door or doors 112, and a passenger side camera provides information related to the passenger side door or doors 112. In some examples, the camera 116 includes a fish eye lens, which may provide an ultra wide-angle view of the side of the vehicle 114. In some examples, the camera 116 is located under the side view mirror 124. In some examples, the camera 116 may be used in combination with one or more other sensors disclosed herein.

In some examples, as shown, the distance D is the minimum distance between the object 118 and the edge 126 of the door 112 spaced farthest away from the hinge 128 of the door 112. In some examples, the edge 126 would be the first portion of the door 112 to strike the object 118. In some examples, the controller 120 is programmed with information about the specifications of the doors 112, including dimensions and swing angles.

In some examples, the vehicle response is one or more of an audio, visual, or audiovisual response to indicate whether a collision between the door 112 and the object 118 is imminent. In some examples, the vehicle response is an audible and/or visual indication of the distance D. In some examples, the vehicle response is an audible and/or visual indication of an angle at which the door 112 may be opened without a collision. In some examples, the response is initiated before the door 112 is opened by an occupant, which may be a driver or passenger in some examples. In some examples, the response is initiated after the door 112 is opened by an occupant. In some examples, the response is initiated when the vehicle 114 is placed in "park" and/or when the vehicle is otherwise stationary.

In some examples, the camera 116 and controller 120 may continue to determine the distance D as the door 112 is being opened. In some examples, the vehicle response may be initiated when the distance D is below a threshold amount. In some examples, the vehicle response may change as the distance D decreases.

Figure 3A:
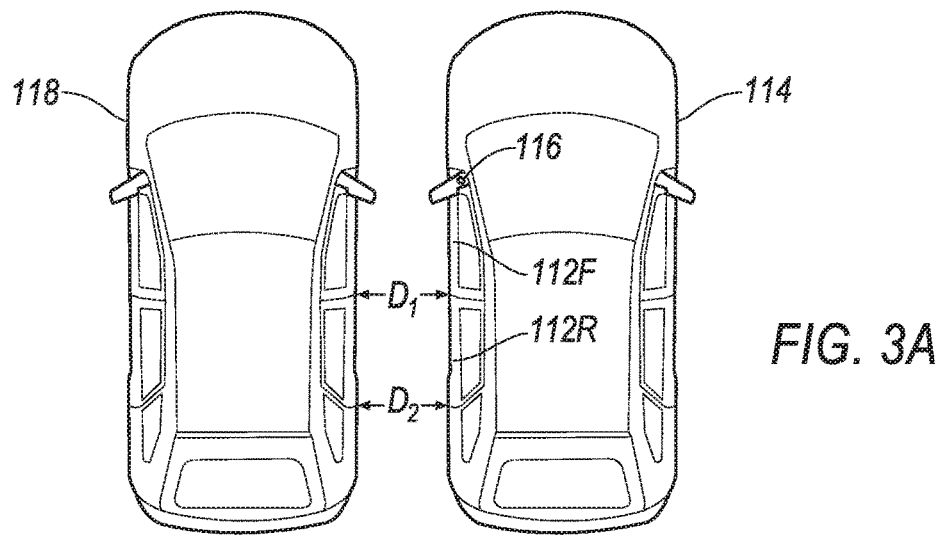
Figure 3B:
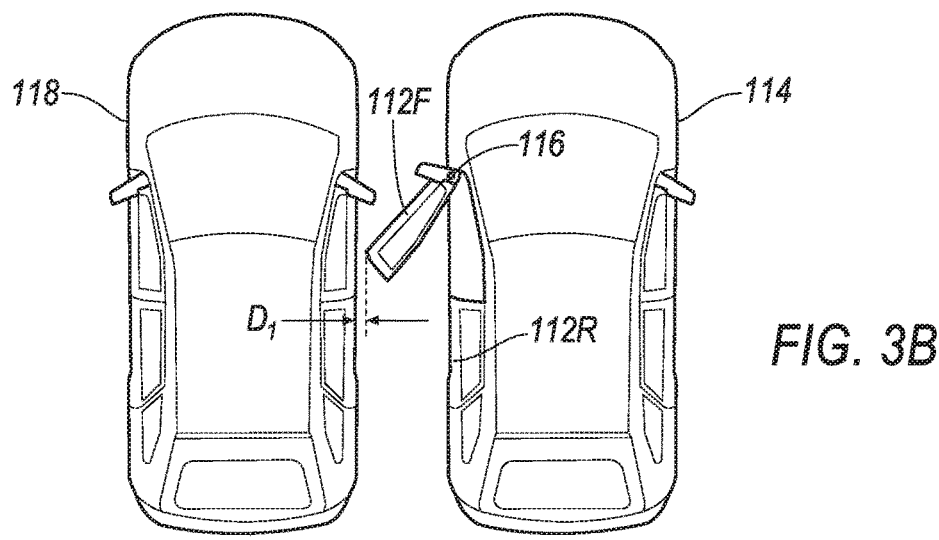
Figure 3C:
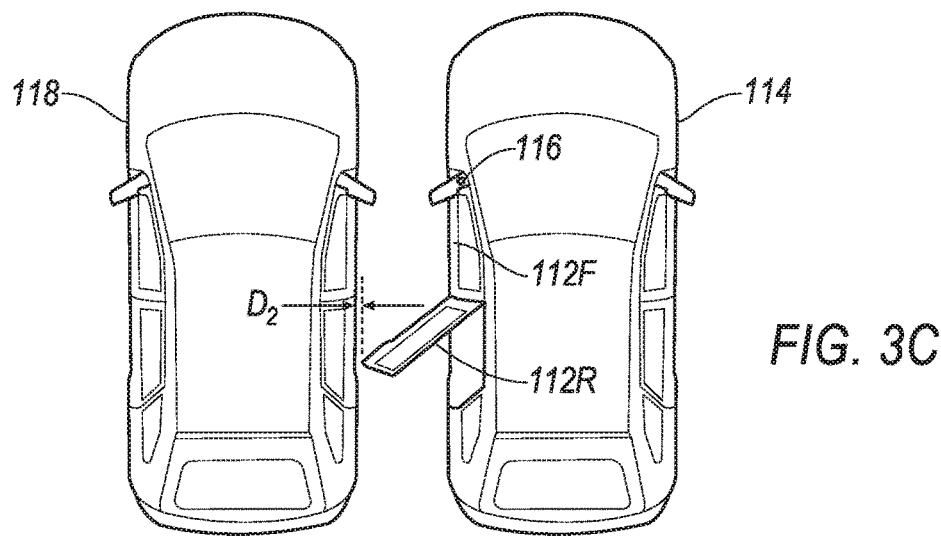

As shown in FIGS. 3A-3C, in some examples, the same camera 116 may be used to sense information for both a front door 112F and a rear door 112R.

Referring to FIG. 3A, in some examples, as shown, the camera 116 senses information related to both the distance D1 between the front door 112F and the object 118 and the distance D2 between the rear door 112R and the object 118.

As shown in FIG. 3B, in some examples, the camera 116 may continue to sense the distance D1 as the door 112F opens toward the object 118. The camera 116 may sense the distance D1, even as the camera 116 moves with the door 112F, in some examples by way of structure from motion sensing or distance estimations from perspective changing to previously sensed objects 118.

As shown in FIG. 3C, the camera 116 may continue to sense the distance D2 as the door 112R opens toward the object 118.

Figure 4A:
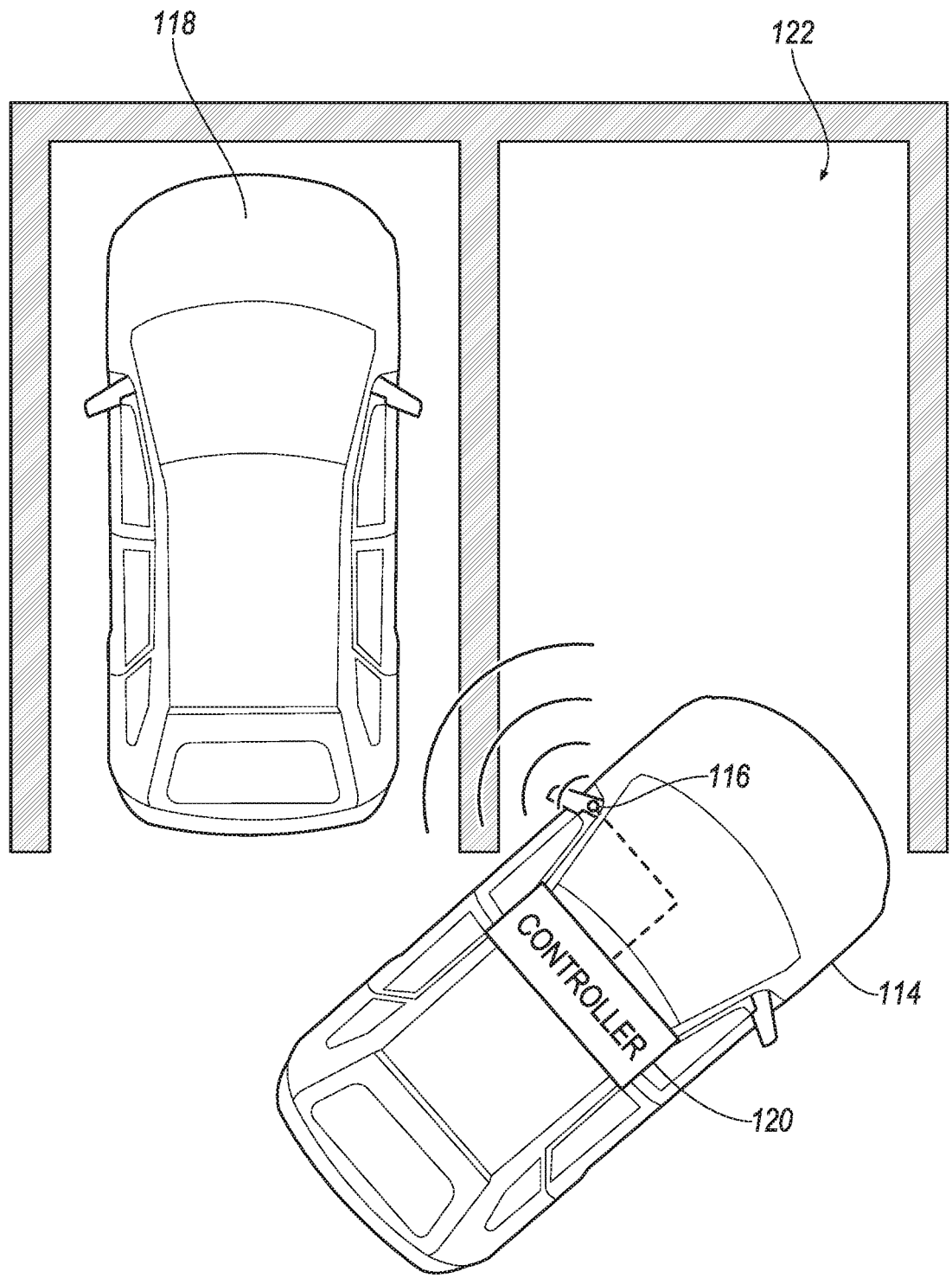
Figure 4B:
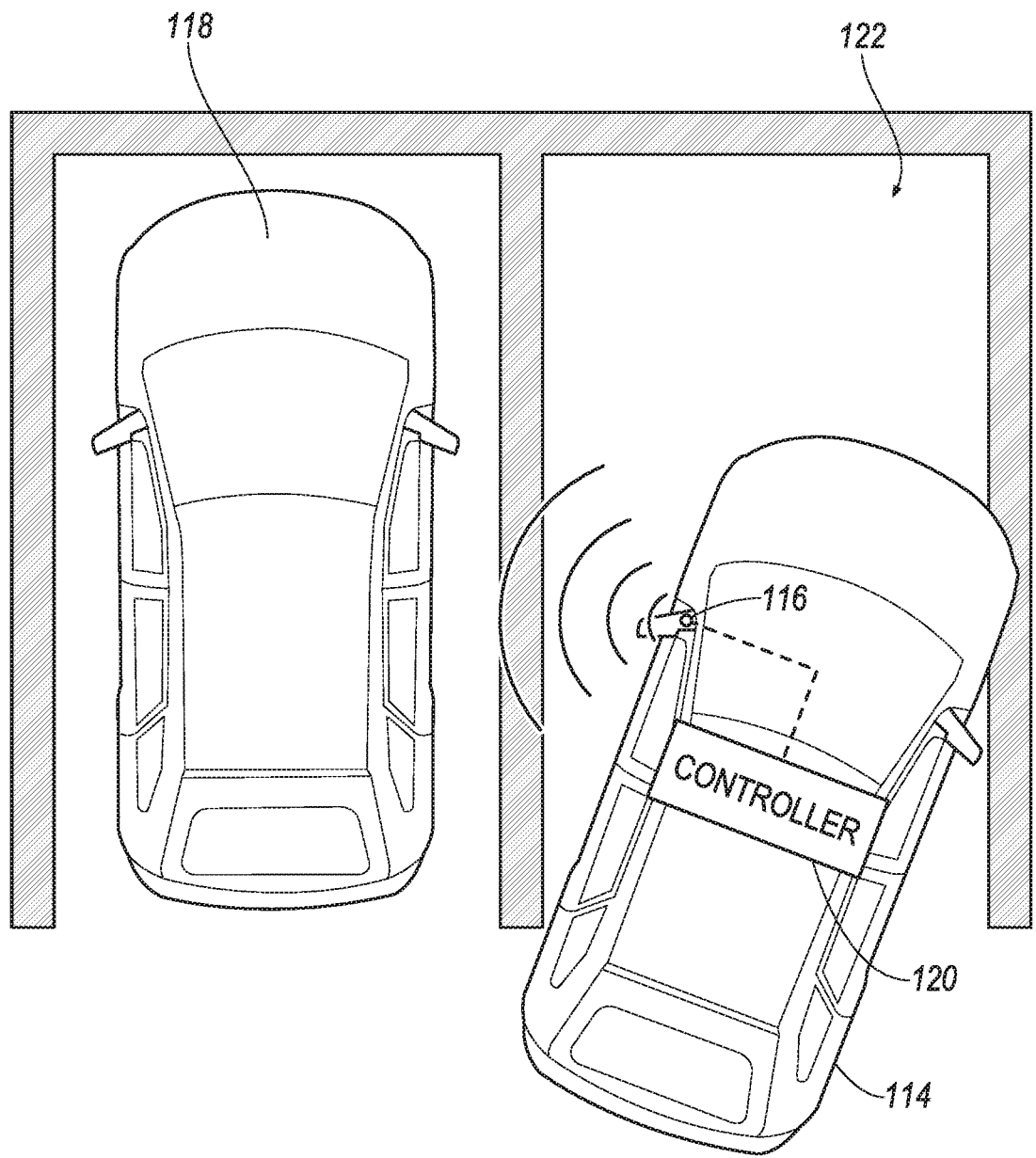
Figure 4C:
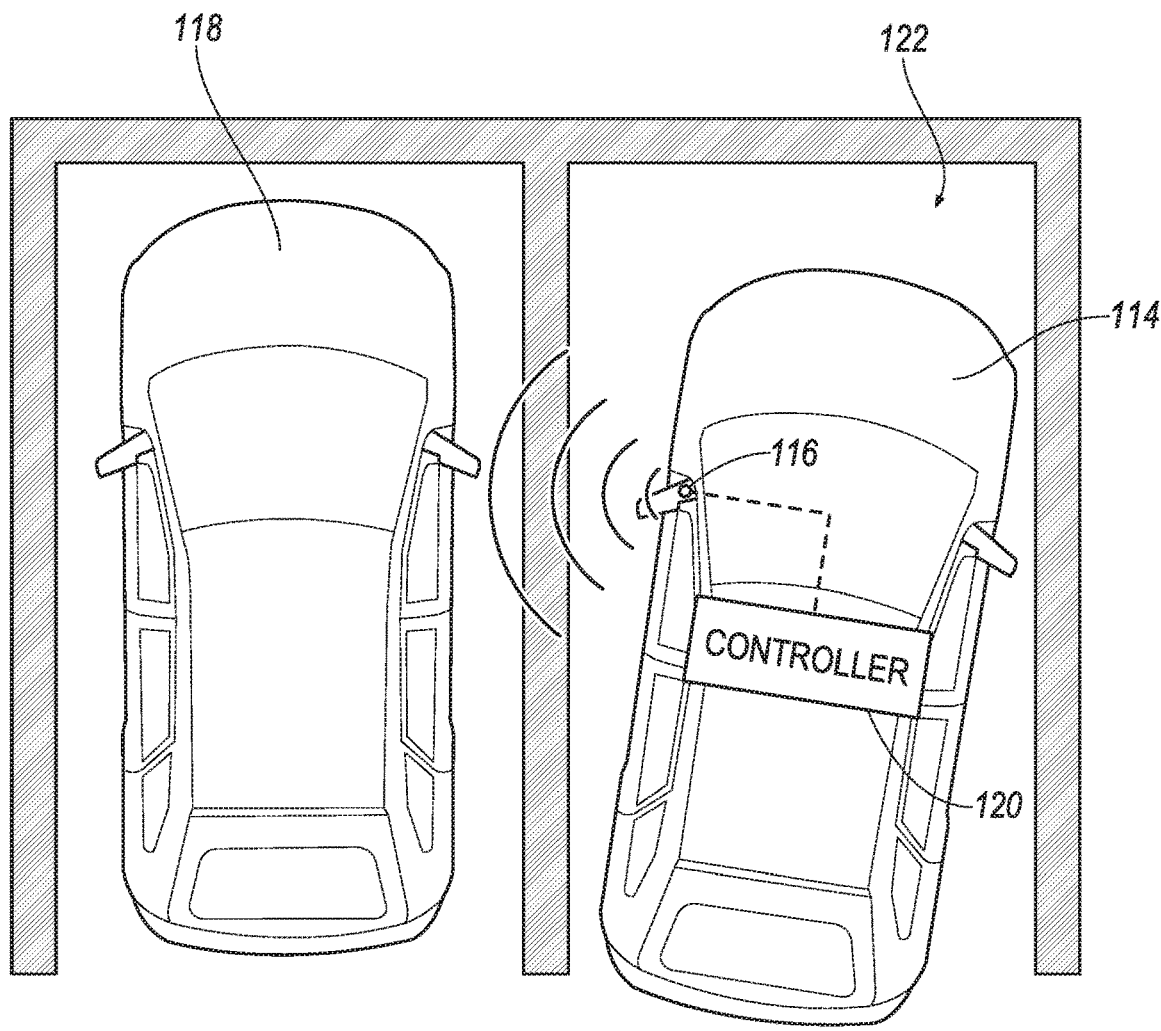

As shown in FIGS. 4A-4C, in some examples, the camera 116 and controller 120 may utilize structure from motion to estimate the three-dimensional structure of the object 118 based on the plurality of images taken by the camera 116. Structure from motion is a photogrammetric range imaging technique for estimating three-dimensional structures from two-dimensional image sequences that may be coupled with local motion signals. As shown schematically, the camera 116 may obtain images of the object 118 in each of the three positions shown in FIGS. 4A-4C as the vehicle 114 pulls into the parking spot 122. The controller 120 may then estimate the three-dimensional structure of the object 118 based on the plurality of images using a structure from motion algorithm. With the three-dimensional estimation, the controller can calculate the distances D1, D2. Although three positions are shown in the illustrative example of FIGS. 4A-4C, more or fewer positions may be utilized in some examples.

In some examples, the controller 120 may be programmed to utilize a semantic segmentation algorithm to detect calculate the object 118 and/or drivable surface on each side of the vehicle 114. Semantic segmentation utilizes image frames camera frames are to recognize various classifications in the vehicle environment, such as the driving surface, cars, pedestrians, curbs and sidewalks, at the pixel level. Semantic segmentation utilizes neural network based detection for image classification at the pixel level. In some examples, semantic segmentation utilizes every pixel of an image within an object class, which may include a specific type of object 118 or the surface between the object 118 and the vehicle 114 in some examples.

In the drivable surface example, the amount of drivable surface may then be utilized to inform the distance between the vehicle 114 and the object 118.

In some examples, semantic segmentation utilizes a forward facing camera, a reverse-facing camera, and one or more side cameras. The sensing may be done one frame at a time. In some examples, semantic segmentation is done on the move or stationary.

Figure 5:
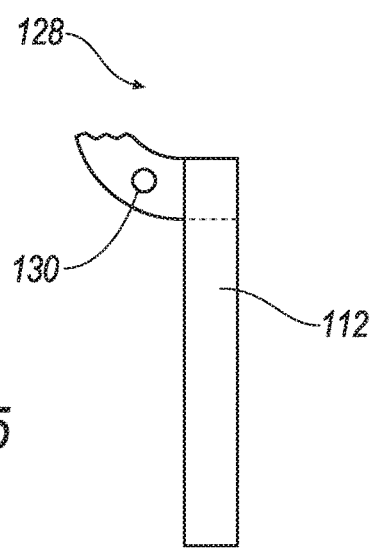

As illustrated schematically in FIG. 5, in some examples, a hinge 128 may include one or more detents 130 in a location at which the door 112 may rest at a certain intermediate open position. In some examples, the vehicle response may occur if opening the door to that detent 130 would result in a collision with the object 118.

Figure 6:
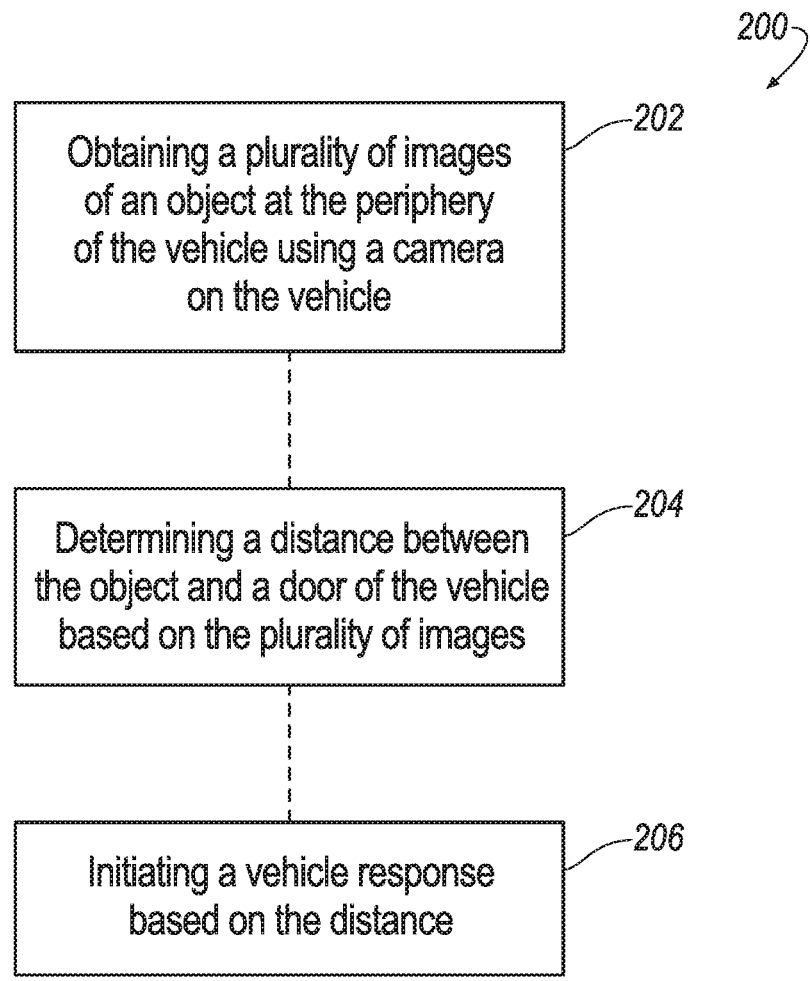

FIG. 6 illustrates a flow chart of a method 200 for assisting in the opening of a vehicle door. At 202, the method 200 includes obtaining a plurality of images of an object at the periphery of the vehicle using a camera on the vehicle. At 204, the method 200 includes determining a distance between the object and a door of the vehicle based on the plurality of images. At 206, the method 200 includes initiating a vehicle response based on the distance.

In some examples, the determining step 204 includes utilizing structure from motion to estimate the three-dimensional structure of the object based on the plurality of images. In some examples, the plurality of images are obtained as the vehicle pulls into a parking spot.

In some examples, the systems and method disclosed give vehicle occupants an indication of the distance to collision between their opening doors and nearby objects.

Although the different examples are illustrated as having specific components, the examples of this disclosure are not limited to those particular combinations. It is possible to use some of the components or features from any of the examples in combination with features or components from any of the other examples.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method for assisting in the opening of a vehicle door, the method comprising:
    obtaining a plurality of images of an object at the periphery of the vehicle using a camera on the vehicle;
    determining a distance between the object and a door of the vehicle based on the plurality of images; and
    initiating a vehicle response based on the distance,
    wherein the plurality of images are obtained as the vehicle pulls into a parking spot before the vehicle reaches a final parking position in the parking spot,
    wherein the vehicle response provides at least one of an audio indication or a visual indication of an angle at which the door may be opened without colliding with the object, and
    wherein the door includes one or more detents for holding the door at one or more intermediate open positions, and the vehicle response occurs if opening the door in the one or more detents would result in a collision with the object.

2. The method as recited in claim 1, wherein the distance is a distance between the object and an edge of the door farthest from a hinge of the door.

3. The method as recited in claim 1, wherein the camera is disposed on or adjacent a side view mirror of the vehicle.

4. The method as recited in claim 3, wherein the camera includes a fish eye lens.

5. The method as recited in claim 1, wherein the determining step includes utilizing structure from motion to estimate the three-dimensional structure of the object based on the plurality of images.

6. The method as recited in claim 1, wherein the determining step is performed at a controller on the vehicle.

7. The method as recited in claim 1, wherein the vehicle response is an audiovisual response that indicates whether a collision between the door and the object is imminent.

8. The method as recited in claim 1, wherein the vehicle response is an audible indication of the distance.

9. The method as recited in claim 1, wherein the camera is located on one of the driver's side and passenger's side of the vehicle, and the door is located on the one of the driver's side and passenger's side of the vehicle.

10. The method as recited in claim 9, wherein the door is a front door or a rear door.

11. The method as recited in claim 1, wherein the determining step includes utilizing semantic segmentation based on the plurality of images.

12. A system for assisting in the opening of a vehicle door, comprising:
    a camera disposed on the vehicle for obtaining a plurality of images of an object at the periphery of the vehicle;
    a controller configured to determine a distance between the object and a door of the vehicle based on the plurality of images and to initiate a vehicle response based on the distance, wherein the plurality of images are obtained as the vehicle pulls into a parking spot before the vehicle reaches a final parking position in the parking spot, wherein the vehicle response provides at least one of an audio indication or a visual indication of an angle at which the door may be opened without colliding with the object, and wherein the door includes one or more detents for holding the door at one or more intermediate open positions, and the vehicle response occurs if opening the door in the one or more detents would result in a collision with the object.

13. The system as recited in claim 12, wherein the vehicle response is an audiovisual response that indicates whether a collision between the door and the object is imminent.

14. The system as recited in claim 12, wherein the vehicle response is an audible indication of the distance.

15. The system as recited in claim 12, wherein the camera is disposed on or adjacent a side view mirror of the vehicle.

16. The system as recited in claim 12, wherein the camera includes a fish eye lens.

17. The system as recited in claim 12, wherein the controller is configured to utilize a structure from motion algorithm to estimate the three-dimensional structure of the object based on the plurality of images.

18. The system as recited in claim 12, wherein the controller is configured to utilize a semantic segmentation algorithm to determine the distance.

* * * * *